United States Patent
Tausch et al.

[11] Patent Number: 5,332,888
[45] Date of Patent: Jul. 26, 1994

[54] SPUTTERED MULTI-LAYER COLOR COMPATIBLE SOLAR CONTROL COATING

[75] Inventors: Peter J. Tausch, Perrysburg; Ronald D. Goodman, Toledo, both of Ohio

[73] Assignee: Libbey-Owens-Ford Co., Toledo, Ohio

[21] Appl. No.: 267,988

[22] Filed: Nov. 7, 1988

Related U.S. Application Data

[63] Continuation-in-part of Ser. No. 223,681, Jul. 25, 1988, Pat. No. 4,943,484, which is a continuation of Ser. No. 898,098, Aug. 20, 1986, abandoned, which is a continuation-in-part of Ser. No. 147,015, Feb. 5, 1988, Pat. No. 4,786,784, which is a continuation-in-part of Ser. No. 14,984, Feb. 17, 1987, abandoned.

[51] Int. Cl.$^5$ .............................................. H05B 3/10
[52] U.S. Cl. .................................... 219/547; 219/553; 219/203
[58] Field of Search ............... 219/547, 522, 552, 553, 219/203, 548; 204/192.21; 427/163

[56] References Cited

U.S. PATENT DOCUMENTS

| | | | |
|---|---|---|---|
| 4,179,181 | 12/1979 | Chang | 427/160 X |
| 4,782,216 | 11/1988 | Woodward | 219/547 |
| 4,786,783 | 11/1988 | Woodward | 219/547 |

FOREIGN PATENT DOCUMENTS 2134444 8/1984 United Kingdom .

Primary Examiner—C. L. Albritton
Attorney, Agent, or Firm—Marshall & Melhorn

[57] ABSTRACT

A glazing unit having incorporated therewith a solar control filter, comprising combinations of layers of transparent films adhered to the surface of a transparent glass sheet. A protective covering is provided over the coating stack. The coating stack includes at least three layers of zinc oxide and at least two layers of silver deposited alternately one upon another, with each layer of silver between two layers of zinc oxide. The glazing unit exhibits color compatibility in environments, where normally employed. The electrically conducting silver layers enable the coating stack to optionally be utilized as a defogging and deicing system for the unit.

12 Claims, 1 Drawing Sheet

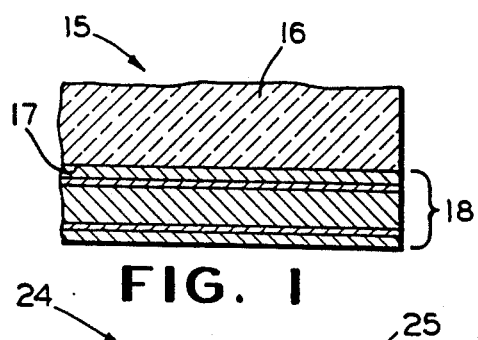
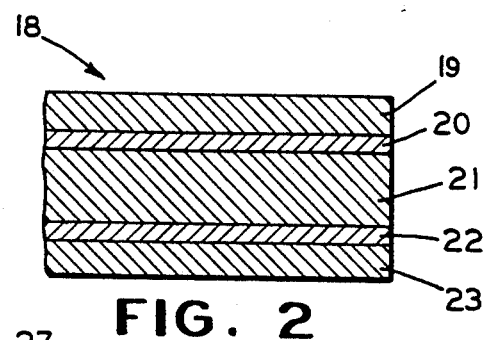
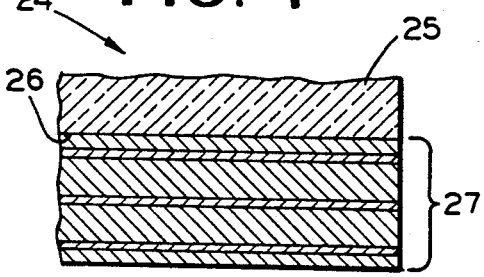
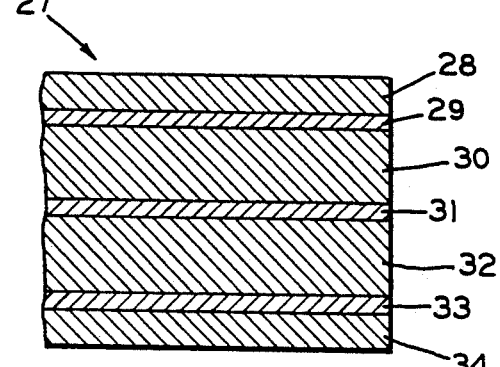
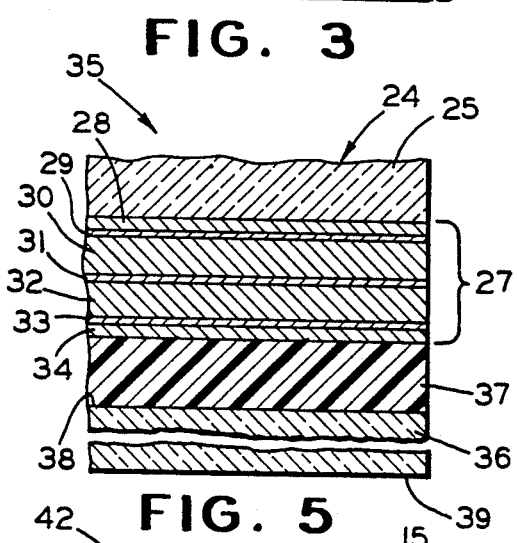
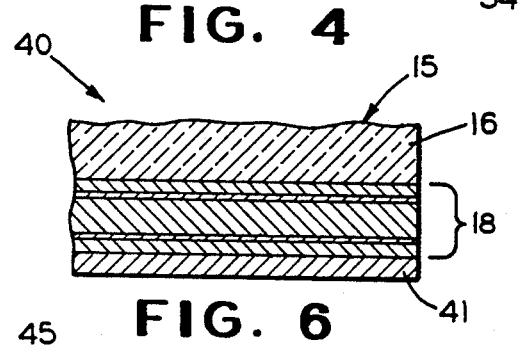
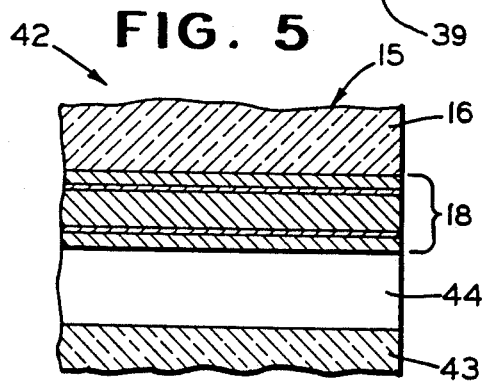
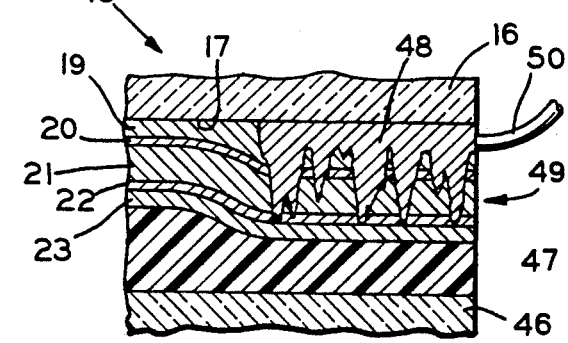
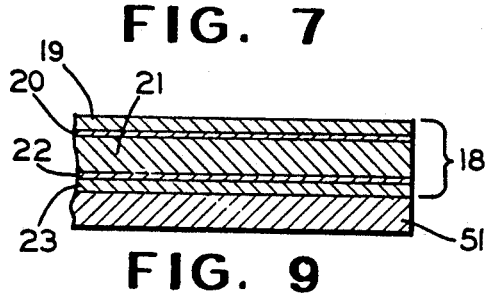
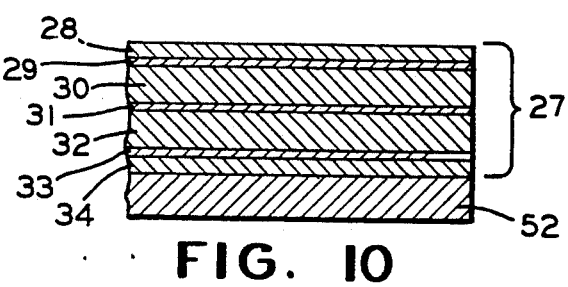

1

SPUTTERED MULTI-LAYER COLOR COMPATIBLE SOLAR CONTROL COATING

RELATED APPLICATIONS

This application is a continuation-in-part of U.S. application Ser. No. 07/223,681, filed Jul. 25, 1988, now U.S. Pat. No. 4,943,484, which, in turn, is a continuation of U.S. application Ser. No. 06/898,098, filed Aug. 20, 1986, now abandoned, and a continuation-in-part of U.S. application Ser. No. 07/147,015, filed Feb. 5, 1988, now U.S. Pat. No. 4,786,784, which, in turn, is a continuation-in-part of U.S. application Ser. No. 07/014,984, filed Feb. 17, 1987, now abandoned.

BACKGROUND OF THE INVENTION

1. Field of the Invention

The present invention pertains to transparent glazing units, and more particularly to such glazing units having transparent coatings adapted to reduce solar transmittance and increase solar reflection for minimizing solar heat gain through the glazing unit. The coatings include electrically conducting components which permit optional heating of the glazing units.

2. Description of the Prior Art

It has long been recognized that transmission of solar energy through glass results in significant heat gain within glazed enclosures. In an effort to reduce this transmission of solar energy, and thus heat gain, so-called heat-absorbing glasses were developed wherein the solar energy outside of a particular bandwidth is absorbed by predetermined elements in the glass and reradiated as heat. With the advent of air conditioning, particularly in automobiles, reducing transmission of solar energy through the glazing units became increasingly important in order to minimize the load on the air conditioning systems.

In order to comply with Federal standards, it is important that automotive glass have a low total solar transmission, with relatively high transmission in the visible spectrum. The standards specify that automotive glass have Illuminant "A" Transmittance of at least seventy percent in the visible spectrum. Such a transmission level in the visible spectrum insures that drivers will be able to safely view objects outside the vehicle under all light conditions, including headlights of oncoming vehicles. To be deemed a heat absorbing glass, the total solar transmittance must not exceed fifty percent at the same glass thickness.

Heat absorbing glass is conventionally made by incorporating into the glass batch materials, additional iron so as to maintain in the glass following melting, refining and forming, an increased level of iron in the ferrous state. Such glass has a slightly greenish appearance. While such heat absorbing glass does exhibit lower solar transmission, it is not entirely effective in reducing heat gain behind the glazing unit. Thus, as the unit absorbs energy it becomes heated and consequently reradiates the absorbed energy both to the inside and the outside of the enclosed space. Energy reradiated to the enclosed space, as to a vehicle or building interior, becomes a solar heat gain which is added to the direct solar heat gain resulting from solar energy passing through the glass unabsorbed. As the amount of glass employed in building structures and vehicles increases in response to aesthetic and styling dictates, the solar heat gain also increases, resulting in increased air conditioning loads.

More recent efforts have been concentrated on reducing heat gain by increasing total solar reflection of the glass. Radiation from the sun which is reflected and not absorbed, does not result in a heat gain behind the glazing unit since it is neither transmitted through the unit nor absorbed thereby to be transformed into heat. To that end, it has been previously proposed to provide glazing units with various forms of filters exhibiting improved characteristics of solar reflection. The filters generally provide for high transmission over the visible portion of the solar spectrum and high reflection over the infrared portion. Recent filters of this nature for glazing units, and particularly for multi-layer automotive windshields, have included a stack of coatings comprising two or more materials deposited in alternate layers on the surface of a substrate, either the glass itself or a polyester base which is, in turn, laminated to a surface of the glazing unit. Generally the composition and the thickness of the layers are selected, and the stack is designed, to minimize the heat energy absorbed inside the glazed enclosure such as, for example, an automobile, by reducing solar transmittance and/or increasing solar reflection. However, it has been found that with the combinations of layer compositions and thicknesses employed heretofore, the glazing units exhibit an objectionable visible reflectance and color which often clash with the setting in which they are utilized. There has not been available a glazing unit having a multi-layer coating possessing the desired features of reduced visible reflectance, low total solar transmittance, high solar reflection and compatible color.

SUMMARY OF THE INVENTION

In accordance with the present invention, there is provided a glazing unit having incorporated therewith a novel induced transmission filter comprising combinations of layers of transparent films affixed to the surface of the glass, either directly or by means of an intermediate plastic laminating layer. A protective covering is provided over the stack of coatings, which covering may comprise a hard overcoat applied to the exterior of the film stack, a second sheet of glass affixed in spaced relation to the sheet carrying the film stack so that the film stack is within the enclosed space between the sheets, or a second sheet of glass laminated to the film-carrying surface of the glazing unit by means of a plastic interlayer. The stack of coatings comprises layers of dielectric material alternating with silver in a sequence such as glass/dielectric/silver/dielectric/silver/dielectric/etc., wherein the number of silver layers can be two or three, and where the dielectric thicknesses in the stack are not necessarily equal to each other and the thickness of the silver layers may likewise vary. Each such dielectric layer is formed of a material selected from the group including zinc oxide, titanium dioxide and tin oxide. The transmission and reflection properties of the glazing unit can be changed, optimized and custom designed by suitably varying the number, composition and thickness of the individual layers. Due to the unique combination of layer numbers, compositions and thicknesses, a glazing unit bearing the novel coating exhibits a color compatibility not heretofore available in such units. The electrically conducting properties of the silver layers enable the coating stack to optionally be utilized as a defogging and deicing system for the unit.

BRIEF DESCRIPTION OF THE DRAWINGS

In the accompanying drawings, wherein like numerals depict like parts throughout the same:

FIG. 1 is a fragmentary cross-sectional view of a glass sheet having a coating stack on a surface thereof in accordance with the invention;

FIG. 2 is an enlarged, fragmentary cross-sectional view of the coating layers or stack of FIG. 1;

FIG. 3 is a fragmentary cross-sectional view of a glass sheet having an alternative embodiment of the coating stack on a surface thereof;

FIG. 4 is an enlarged, fragmentary cross-sectional view of the coating layer or stack of FIG. 3;

FIG. 5 is a fragmentary cross-sectional view of a laminated glass assembly incorporating the coating stack of FIGS. 1 and 2;

FIG. 6 is a fragmentary cross-sectional view of a monolithic glazing unit incorporating the solar control coating stack of FIGS. 1 and 2 and having a protective coating thereover;

FIG. 7 is a fragmentary cross-sectional view of a multiple sheet insulating glass glazing unit incorporating the solar control coating stack of FIGS. 1 and 2;

FIG. 8 is a fragmentary cross-sectional view of a laminated glass assembly incorporating the coating stack of FIGS. 1 and 2 and which is adapted to be electrically heated;

FIG. 9 is a fragmentary view, similar to FIG. 2, showing alternate embodiments of the coating stack of FIGS. 1 and 2; and FIG. 10 is a fragmentary view similar to FIG. 4, showing alternate embodiments of the coating stack of FIGS. 3 and 4.

DESCRIPTION OF THE PREFERRED EMBODIMENTS

A solar control glazing unit in accordance with the invention includes a glass sheet having an induced transmission filter formed as a film adhered to a major surface of the sheet. The film comprises alternate layers of dielectric and silver which cumulatively tend to reflect the ultraviolet and infrared wave lengths of solar radiation, while transmitting a high percentage of light in the visible wave length range so as to comply with Federal standards for automotive use. The glazing unit presents a compatible color as compared to other currently available solar control units, which exhibit a copper or bronze tint deemed objectionable under many circumstances, particularly in units for automotive use.

The color compatibility, which results from a unique combination of layer compositions and thicknesses, is best defined by reference to the CIELAB color scale system. Thus, the CIE (Commission Internationale de l'Eclairage) established several illuminants of known spectral distributions as standards for use in color measurements. Tristtmulus colorimetry is based upon the fact that any color can be reproduced by three other colors of controlled amounts. Tristimulus color scales include the X, Y, Z system which represents the ratios of the integrals of light reflected from a sample being measured to the integrals of light reflected from a perfect diffuser, when both are multiplied wavelength by wavelength by the response curve of the Standard Observer and by the Illuminant "C". The 1931 CIE Standard Observer response curves define the amount of each of three primary lights (green, amber and blue) needed to reproduce energy of each wavelength from 380 nm to 750 nm wherein the green curve is the standard luminosity curve for the human eye (x is amber, y is green and z is blue).

The L, a, b tristimulus system has gained wide acceptance in recent years. L represents the mathematical approximation of the non-linear black-white response of the eye. A perfect white has a value of one hundred and a perfect black has a value of zero. The values of "a" and "b" identify the hue and chroma or color of the sample. A plus value of "a" indicates redness and a minus value indicates greenness. A plus value for "b" indicates yellowness and a minus value indicates blueness. The 1976 CIE L*, a*, b* scale, or CIELAB scale, has the following relationship with the CIE x, y, z scale:

$$L^* = 116(Y/Y_o)^{\frac{1}{3}} - 16$$

$$a^* = 500((X/X_o)^{\frac{1}{3}} - (Y/Y_o)^{\frac{1}{3}})$$

$$b^* = 200((Y/Y_o)^{\frac{1}{3}} - (Z/Z_o)^{\frac{1}{3}})$$

where $X/X_o$, $Y/Y_o$ and $Z/Z_o$ are each greater than 0.01 and $X_o$, $Y_o$, $Z_o$ define the color of the nominally white object-color stimulus.

In accordance with the invention, the desired compatible color is defined as having the following CIELAB scale parameters:

Transmitted Color: $a^* = -4.0 \pm 4.0$; $b^* = 3.0 \pm 5.0$
Illuminant "A" $\geq 70\%$ Reflected Color: $a^* = 0.0 \pm 5.0$; $b^* = -5.0 \pm 8.0$
$L^* \leq 42$ As a point of reference, green tinted glass known commercially as "EZ Eye" in a windshield, has the following color numbers:

Transmitted color: $a^* = 5.5$; $b^* = +0.2$
Reflected color: $a^* = -1.7$; $b^* = -0.9$ The properties of the window assembly or glazing unit according to this invention include an Illuminant "A" transmittance greater than or equal to 70 percent, an Illuminant "C" reflectance from either glass exposed surface less than or equal to 12.5 percent, a total solar transmittance less than or equal to 42 percent, and a filmed sheet resistance less than or equal to 4 ohms per square. The total solar gain through the window assembly is less than that experienced with present day unfilmed assemblies. A somewhat more specific definition of these properties include an Illuminant "A" transmittance in the range of 70 to 80 percent, an Illuminant "C" reflectance in the range of 7 to 12.5 percent, a filmed sheet resistance in the range of 2.5 to 4 ohms per square, a total solar transmittance between 36 and 42 percent, and a total solar reflectance greater than 29 percent.

Referring now to the drawings, and particularly to FIGS. 1 to 4, the film of the invention includes a plurality of alternating layers of silver and zinc oxide, with each layer of silver being disposed between two layers of zinc oxide. The film is preferably built up, layer-by-layer, as by sputtering upon a glass sheet substrate. However, it may also be formed in other known ways as by being deposited upon an intermediate layer, for example of polyester terethalate, which is affixed to a polyvinyl butyral layer and which, in turn, is subsequently laminated to a glass substrate. The outer surface of the film stack must be protected against exposure to abrasive elements, and to that end may be assembled with another glass sheet or covered by a durable hard coating. Various combinations of glass assemblies incorporating solar control coatings are disclosed and described in the aforementioned applications, of which this is a continuation-in-part. It is contemplated that the coatings of the present invention may similarly be assembled in these and other combinations.

There is shown in FIG. 1 a coated unit 15 formed in accordance with one embodiment of the invention and which, as will be hereinafter explained, may be incorporated in various forms of solar control glazing units. The coated unit comprises a glass sheet or substrate 16 having a surface 17 to which has been applied a solar control film 18. As shown in FIG. 2, the film 18 comprises a first layer 19 of zinc oxide affixed to the surface 17 of the glass sheet, a layer 20 of silver bonded to the layer 19, a second layer 21 of zinc oxide bonded to the layer 20, a second layer 22 of silver bonded to the layer 21, and a third layer 23 of zinc oxide bonded to the layer 22. Thus, the layers of electrically conducting silver are disposed between the dielectric layers of zinc oxide so that a glazing unit in which the coated unit is incorporated may optionally be electrically heated for purposes of defogging and/or deicing the unit.

In the aforedescribed five layer solar control film stack, as well as the seven layer stack to be hereinafter described, the outer zinc oxide layers, that is, the two surface layers of the stack, have thicknesses in the range from about 200 to 500 angstroms. The interior zinc oxide layer or layers, that is, those disposed between silver layers, have a thickness in the range from about 400 to 1500 angstroms. The layers of silver have a thickness in the range from about 80 to 180 angstroms. Both the five layer and the seven layer film stacks exhibit a sheet resistance of about 2.0 to 4.5 ohms per square. In laying down the films a barrier layer of zinc metal having a thickness in the range from about 20 to 40 angstroms, and preferably about 25 angstroms, is deposited on each silver layer to insure that the silver metal does not oxidize upon subsequent deposition of the overlying zinc oxide layer. However, this zinc metal barrier layer is subsequently oxidized during deposition of the zinc oxide so as to merge therewith and not be perceptible as a layer separate from the zinc oxide layer of the stack. It will be understood that as hereinafter described and claimed the appropriate zinc oxide layers include this barrier layer deposited as zinc metal and subsequently oxidized and merged into the zinc oxide layer.

The layers 20 and 22 of silver have near-infrared reflective properties. The unit thus exhibits good solar performance with respect to reducing heat gain. The sandwich design results in great flexibility in optical properties and reflected color reduction. When used for automotive glazing, the units yield a generally compatible reflected color as viewed from the exterior, which does not clash with other glazing units or the body paint and trim.

In the embodiment of FIGS. 3 and 4, there is disclosed a coated unit 24 comprising a glass sheet 25 having deposited on one of its surfaces 26 an alternate solar control film 27 in accordance with the invention. The film 27 is similar in structure to the film 18, with the addition of a third layer of silver and a fourth layer of zinc oxide. As shown in FIG. 4, the film 27 comprises a layer 28 of zinc oxide deposited upon the surface 26 of the sheet, followed in succession by a first layer 29 of silver, a second layer 30 of zinc oxide, a second layer 31 of silver, a third layer 32 of zinc oxide, a third layer 33 of silver and a fourth layer 34 of zinc oxide. The film 27 thus comprises a seven layer stack having alternating layers of silver sandwiched between dielectric layers of zinc oxide.

As indicated above, the film stacks 18 and 27 require protection from abrasive elements. To that end, the coated units 15 and 24 may be incorporated into glazing units as shown in FIGS. 5 through 8, as well as other combinations. Thus, there is shown in FIG. 5 a laminated structure 35 incorporating the solar control unit 24 of FIGS. 3 and 4, and which is particularly adapted for use as an automobile glazing unit such as a windshield. In the structure the coated unit 24 is laminated to a second glass sheet 36 as by means of a polyvinyl butyral, or PVB, interlayer 37. The interlayer 37 is bonded to the outer surface of the zinc oxide layer 34 and the inner surface 38 of the glass sheet 36. The opposite surface 39 of the sheet 36 conventionally faces the interior of the vehicle in which the glazing unit is mounted, so that the film stack is considered as being on the second surface of the glazing unit. However, it is contemplated that the unit may be reversed so that the film stack would be on the third surface. The unit may, for example, comprise glass sheets 25 and 36 each 0.090 inch (2.3 mm) thick and a PVB interlayer 37 of 0.030 inch (0.8 mm) thickness. It will be understood, of course, that both the glass sheets and PVB interlayer may be of other and different thicknesses suitable for such laminated units. Due to the nature of PVB, that is, its elasticity and extendibility, the interlayer 37 not only acts as the laminating medium, but also functions to cushion the impact of the head of a passenger or driver thrown against the windshield in the event of an accident.

There is shown in FIG. 6 a glazing unit 40 comprising the coated unit 15 of FIGS. 1 and 2, wherein an abrasion resistant or protective layer 41 has been applied over the film 18. The layer 41 may be in the form of a suitable hardcoat or a polyvinyl butyral material. The unit might, of course, optionally utilize the coated unit 24 of FIGS. 3 and 4. Such units may advantageously be employed as automotive side lights or back lights, which are conventionally fabricated as a monolithic or single glass sheet. It is also contemplated that the glazing unit 40 might be employed as one of the glass sheets of a conventional laminated unit, with the film stack and protective layer 41 disposed on an exterior surface of the unit.

In the embodiment of FIG. 7, the coated unit 15 of FIGS. 1 and 2 has been incorporated into a multiple sheet insulating glass unit, shown generally at 42. Such units conventionally comprise two or more sheets of glass separated from one another and secured in spaced relation around their peripheral margins to form enclosed air spaces therebetween. Thus, in the embodiment of FIG. 7 the glass sheet 16, having the film 18 thereon, is secured to a second glass sheet 43 to define an enclosed air space 44 therebetween. The film stack 18 is disposed within the enclosed air space so as to be protected from damage by external elements.

The embodiment of FIG. 8 utilizes a coated unit 15, as shown in FIGS. 1 and 2, in a so-called heated windshield 45 for automotive vehicles. More particularly, the glass sheet 16 having the film stack 18 thereon is laminated to a second or inboard glass sheet 46 by means of an interlayer 47 in the manner of the embodiment of FIG. 5. Provision is made for the conducting layers 20 and 22 to be incorporated into an electrical circuit which can be selectively energized so that the layers function as resistance heating elements. To that end, a bus bar 48 is provided on the surface 17 along each end edge of the outboard sheet 16 (only one edge shown). The film stack is deposited in the usual manner to extend over the bus bars. The bus bars have a relatively rough surface, and since the layers of the film stack are extremely thin, it has been found that the surface irregularities of the bus bars project through the dielectric layers 19 and 22 to make electrical contact with the conducting layers 20 and 22 of silver in the region 49 over the bus bar. The layers 20 and 22 thus are electrically connected with the bus bars 48 along the opposite side edges of the windshield 45. Leads 50 are affixed to the bus bars for connecting the unit to a suitable electrical source, preferably the electrical system of the vehicle. It will be understood, of course, that the windshield 45 might alternatively utilize the film stack 27 of FIGS. 3 and 4, or the film stacks depicted in FIGS. 9 and 10, to be hereinafter described. Likewise, it is contemplated that the electric heating feature of the embodiment of FIG. 8 may be incorporated into the glazing units of FIGS. 6 and 7.

FIGS. 9 and 10 depict solar control film stacks for glazing units formulated in accordance with the invention which are similar to those of FIGS. 2 and 4, respectively, and which include an additional metal oxide layer over the outermost zinc oxide layer for the purpose of improving adhesion between the film stack and the PVB interlayer (37, 47) or the abrasion-resistant layer 41. Thus, there may be deposited upon the zinc oxide layers 23 and 34 an additional layer 51 or 52, respectively, of tin oxide or titanium dioxide in a thickness between about 50 and 150 angstroms. The additional layer has been found to materially enhance adhesion without substantially affecting the optical and color properties of the unit. Of course, it is contemplated that adhesion might also be enhanced in other and different ways, as by treating the surface of the film stack and/or interlayer with an adhesion control agent. One such agent found particularly well suited for this purpose is gamma-aminopropyltriethoxysilane, available from Union Carbide Corporation under their product designation A-1100. The agent may be applied to the film stack over the outermost zinc oxide layer by spraying, using a 0.1 to 1.5 percent solution in isopropyl alcohol.

EXAMPLE I

A glazing unit in accordance with the embodiment of FIG. 5 comprises a sheet 25 of clear glass of nominal 0.090 inch thickness. Dielectric layers of zinc oxide and metallic silver are alternately deposited by sputtering on the surface of the glass in the following sequence:
layer 28—zinc oxide of 294 angstroms thickness
layer 29—silver of 88 angstroms thickness
layer 30—zinc oxide of 613 angstroms thickness
layer 31—silver of 92 angstroms thickness
layer 32—zinc oxide of 611 angstroms thickness
layer 33—silver of 89 angstroms thickness
layer 34—zinc oxide of 284 angstroms thickness
This coated unit is laminated to another sheet 36 of clear glass of nominal 0.090 inch thickness by means of a PVB interlayer 37 of 0.030 inch nominal thickness. The completed glazing unit has the following optic and color (CIE L*, a*, b*) properties:

| | |
|---|---|
| Total Solar Transmittance | 41.4% |
| Illuminate "A" Transmittance | 71.8% |
| Total Solar Reflectance (#1 Surface) | 32.1% |
| Illuminant "C" Reflectance (#1 Surface) | 6.9% |
| Transmitted Color | a* = −3.75; b* = +4.22 |
| Reflected Color | a* = +0.98; b* = −0.07 |

EXAMPLE II

Another glazing unit in accordance with the embodiment of FIG. 5, comprising two sheets 25 and 36 of clear glass of nominal 0.090 inch thickness and a PVB interlayer 37 of 0.030 inch thickness, has the following solar control film stack 27:
layer 28—zinc oxide of 322 angstroms thickness
layer 29—silver of 102 angstroms thickness
layer 30—zinc oxide of 736 angstroms thickness
layer 31—silver of 95 angstroms thickness
layer 32—zinc oxide of 895 angstroms thickness
layer 33—silver of 98 angstroms thickness
layer 34—zinc oxide of 279 angstroms thickness
The unit has the following optical and color (CIE L*, a*, b*) properties:

| | |
|---|---|
| Total Solar Transmittance | 38.7% |
| Illuminate "A" Transmittance | 71.6% |
| Total Solar Reflectance (#1 Surface) | 30.6% |
| Illuminant "C" Reflectance (#1 Surface) | 7.5% |
| Transmitted Color | a* = −3.4; b* = +1.5 |
| Reflected Color | a* = −2.5; b* = +1.9 |

EXAMPLE III

A glazing unit in accordance with the embodiment of FIG. 5 but having the five layer coated unit 15 of FIGS. 1 and 2 in place of the seven layer unit 24 of FIGS. 3 and 4, comprising two sheets 10 and 36 of clear glass of nominal 0.090 inch thickness and a PVB interlayer 37 of 0.030 inch thickness, has the following film stack 18:
layer 19—zinc oxide of 305 angstroms thickness
layer 20—silver of 124 angstroms thickness
layer 21—zinc oxide of 768 angstroms thickness
layer 22—silver of 133 angstroms thickness
layer 23—zinc oxide of 303 angstroms thickness
The unit has the following optical and color (CIE L*, a*, b*) properties:

| | |
|---|---|
| Total Solar Transmittance | 41.8% |
| Illuminate "A" Transmittance | 74.6% |
| Total Solar Reflectance | 33.4% |
| Illuminant "C" Reflectance | 9.5% |
| Transmitted Color | a* = −4.2; b* = +5.0 |
| Reflected Color | a* = −0.9; b* = −6.8 |

EXAMPLE IV

Another glazing unit, similar in construction to the unit of Example III, has the following five layer film stack 18:
layer 19—zinc oxide of 307 angstroms thickness
layer 20—silver of 154 angstroms thickness
layer 21—zinc oxide of 781 angstroms thickness
layer 22—silver of 157 angstroms thickness
layer 23—zinc oxide of 298 angstroms thickness The unit has the following optical and color (CIE L*, a*, b*) properties:

| Total Solar Transmittance | 37.6% |
|---|---|
| Illuminate "A" Transmittance | 72.4% |
| Total Solar Reflectance | 37.5% |
| Illuminant "C" Reflectance | 9.9% |
| Transmitted Color | a* = −5.9; b* = +6.2 |
| Reflected Color | a* = +4.2; b* = −11.2 |

In the glazing units of all four examples, the sheet resistance is between about 2.5 to 4.0 ohms per square.

In accordance with the provisions of the patent statutes, the present invention has been described in what is considered to represent its preferred embodiments. However, it should be noted and understood that the invention can be practiced otherwise than as specifically illustrated and described without departing from its spirit or scope.

What is claimed is:

1. A transparent, laminated window having improved defrosting capability comprising, in combination:
    A) an optical element having a sheet resistivity of less than about 3 ohms per square containing:
        (i) at least two electrically conductive metal layers;
        (ii) at least one dielectric spacing layer between said conductive layers; and
    (iii) a transparent substrate; and
        (B) a bus bar electrically conductively associated with each conductive layer.
2. The window of claim 1 wherein the optical element has a sheet resistivity of less than 2.5 ohms per square.
3. The window of claim 2 wherein the transparent substrate for the optical element is glass.
4. The window of claim 2 having a visible transmission of at least 70%.
5. The window of claim 2 having a visible reflection of no more than 16%.
6. The window of claim 2 having a solar rejection of at least 50%.
7. A transparent, laminated window capable of transmitting at least 70% of visible light, rejecting at least 50% of solar radiation and having improved defrosting capability, said window comprising:
    A) an optical element having a sheet resistivity less than 3 ohms per square containing:
        (i) at least two electrically conductive metal layers;
        (ii) at least one dielectric spacing layer between said conductive layers; and
        (iii) a transparent substrate; and
    (B) a bus bar electrically conductively associated with each conductive layer.
8. A transparent, laminated window having improved defrosting capability and reduced oblique viewing angle color reflectance comprising:
    (A) an optical element having a sheet resistivity less than about 6 ohms per square and less than about 11% normal incidence reflection of at any wavelength between 400 and 700 nm, containing:
        (i) at least two transparent, electrically conductive metal layers, each having a thickness of less than 150 angstroms;
        (ii) at least one dielectric layer between said conductive layers;
        (iii) a transparent substrate; and
    (B) a bus bar electrically conductively associated with each conductive layer.
9. The window of claim 8 wherein sheet resistivity is less than about 3 ohms per square.
10. The window of claims 8 or 9 wherein each conductive layer is silver.
11. The window of claim 10 wherein the dielectric layers are titanium oxide.
12. A transparent, laminated window capable of transmitting at least 70% of visible light and having improved defrosting capability and reduced oblique viewing angle color reflectance comprising:
    A) an optical element having a sheet resistivity less than 3 ohms per square and less than 11% normal incidence reflection at any wavelength between 400 and 700 nm light, said optical element comprising:
        (i) at least two silver layers, each having a thickness of 100–130 angstroms;
        (ii) at least one dielectric layer between said silver layers;
        (iii) at least one dielectric layer against the exterior surfaces of the silver layers opposite to those in contact with the layers of (ii);
        (iv) a transparent substrate; and
    (B) a bus bar electrically conductively associated with each silver layer.

* * * * *